United States Patent [19]

Guettler et al.

[11] Patent Number: 5,147,156
[45] Date of Patent: Sep. 15, 1992

[54] GOLF COURSE CONSTRUCTION AND MAINTENANCE METHODS

[75] Inventors: Phillip G. Guettler; Robert G. Ritten, both of Ft. Pierce, Fla.

[73] Assignee: Sandscape Inc., Ft. Pierce, Fla.

[21] Appl. No.: 737,312

[22] Filed: Jul. 29, 1991

[51] Int. Cl.⁵ .................... B65G 53/04; B65G 53/06
[52] U.S. Cl. .................... 406/197; 406/165; 406/79; 406/122; 406/108; 273/176 J; 273/178 B
[58] Field of Search ............ 406/79, 108, 122, 197, 406/164–166; 273/176 J, 178 B, 176 A, 176 B, 176 R

[56] References Cited

U.S. PATENT DOCUMENTS

| | | | |
|---|---|---|---|
| 1,591,378 | 7/1926 | Hansen | 406/79 X |
| 1,673,276 | 6/1928 | Warman | 406/165 X |
| 3,161,442 | 12/1964 | Reed | 406/63 |
| 3,384,422 | 5/1968 | Bourdelon et al. | 406/164 X |
| 4,025,122 | 5/1977 | Diemert | 406/63 |

FOREIGN PATENT DOCUMENTS

| | | | |
|---|---|---|---|
| 9660 | 4/1980 | European Pat. Off. | 406/122 |
| 3911690 | 10/1990 | Fed. Rep. of Germany | 273/176 A |
| 3-072101 | 3/1991 | Japan | 273/176 J |

Primary Examiner—Russell D. Stormer
Assistant Examiner—James M. Kannofsky
Attorney, Agent, or Firm—Carroll F. Palmer

[57] ABSTRACT

In a new method for the placement of sand, gravel or equivalent particulate material onto a sand trap, tee, putting green or other selected area of a golf course for construction or maintenance purposes, sand or other particulate material is pneumatically transported through a flexible conduit from an off-load site remote to the selected area to a nozzle positioned at the selected area and is sprayed from the nozzle onto the selected area. The new method eliminates the labor intensive prior method of wheelbarrowing sand or gravel from the off-load site to the selected site and the need then to rake or hoe the sand or gravel to properly spread it about the selected area.

3 Claims, 2 Drawing Sheets

GOLF COURSE CONSTRUCTION AND MAINTENANCE METHODS

BACKGROUND OF THE INVENTION

1. Field of the Invention

This application relates to new methods of construction and maintenance of golf courses. More particularly, it concerns improved methods for the construction of sand traps, tees and putting greens and the maintenance of sand traps on golf courses.

2. Description of the Prior Art

Sand traps are placed in selected positions around golf courses, typically adjacent the putting greens, to serve as hazards to the golfers playing the course. The sand used in these traps is of special quality and grain size. Hence, typically it must be obtained from a sand mine located some distance from the golf course site and hauled by truck or rail plus truck to the site where it is off-loaded at some location adjacent the golf course that is accessible from a roadway leading thereto.

In the construction of a golf course, the placement of the sand in the traps occurs as one of the final steps in the operation. Thus, all land grading and contouring have been fully completed by the time the sand is to be loaded into the traps. This prohibits the use of tracks, tractors and like heavy moving equipment to transport sand from the off-load location to the sand trap location.

The problem of transporting trap sand from an off-load location to a sand trap location is not limited to construction of golf courses. Thus, periodically, e.g., at three to five year intervals, the sand in the traps must be removed and be replenished with new sand.

Up to the time of the present invention, the conventional procedure for transport of trap sand from an off-load location to a sand trap location has been by wheelbarrow. Thus, wood boards are laid on the ground forming a path from the off-load location to the sand trap location and laborers with wheelbarrows move the sand from the off-load location to the sand trap location, one barrow at a time. As a result, a four to six man crew working full days may take up to five days to supply the sand required to a single sand trap. Further, in the prior used method, once the sand has been wheelbarrowed to the trap, much additional labor is required to rake and properly spread it on the bed of the sand trap. This labor intensive method of operation has persisted for a many years as golf courses have been constructed and maintained.

The present invention improves on the method of sanding traps on golf courses whereby it is possible to sand an average trap in less than a day with a crew of three.

Construction of tees and putting greens on golf courses is another area that, up until the present invention, has been an intensive hand labor operation. Thus, acceptable tees and putting greens require a special type of foundation with well structured water drainage qualities. Until the present invention, the conventional method of creating a putting green has been to form an outlined contour of it in the existing terra firma, sometimes with power equipment, but more often by hand shoveling and raking, at a depth several feet below the intended ultimate grass surface of the putting green. Trenches are then dug in the resulting surface in a predetermined pattern to receive drainage pipe, typically by manual shoveling because mechanical trenchers leave an adjacent pile of earth which must be evenly spread about the contoured area before the next phase of construction is undertaken.

In such next phase, drainage pipe is laid in the trenches and the trench is filled to a contour level by hand shovelling of fill dirt. Then, in a further phase, gravel of prescribed size is spread over the contoured area to a predetermined depth to form a drainage substrate. Conventionally, this has been accomplished using wheelbarrows and hand labor with resulting cost and time problems. The present invention provides new methods of creating golf course putting greens that eliminate the onerous labor and cost problems that have been tolerated for decades by golf course construction contractors because they did not know and have not had available methods that overcome the cost and labor problems that have been so long apparent to them.

The invention involves the pneumatic transport of sand and gravel from an off-load location to a use location. The pneumatic transport of sand and gravel from one location to another, most often as an aqueous slurry, but sometimes per se, has been known for sometime and equipment for doing this is known and is commercially available, e.g., see U.S. Pat. Nos. 3,161,442 and 4,025,122, the disclosures of which regarding equipment construction are incorporated herein by reference. The present invention utilizes this and equivalent available equipment in a manner not previously apparent to those skilled in the art for carrying out the applicants' new improvements for the construction and maintenance of golf courses.

OBJECTS

A principal object of the invention is the provision of a new method for the construction and maintenance of golf courses.

Another object is the elimination of the highly labor intensive aspects of sand trap construction and maintenance and putting green construction that have persisted in the golf course construction industry for decades.

Further objects include the provision of:

1. A new method for the construction and maintenance of golf course sand traps.

2. A new method for the construction of golf course putting greens.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of a new method for the placement of sand, gravel or equivalent particulate material on the traps, tees and putting greens of a golf course for construction or maintenance purposes. Basically the new method comprises pneumatically transporting the sand, gravel or other particulate material through a flexible conduit from an off-load site remote to said trap, tee or putting green location to a nozzle positioned at said location and discharging it from the nozzle onto said trap, tee or putting green.

In carrying out the new method, a quantity of sand, gravel or equivalent particulate material is provided at an off-load site remote to the deposit location. This may be done by trucking the sand or gravel to the off-load site and dumping it in a pile on the ground. Alternatively, this can be done by leaving the sand or gravel in the truck.

In any event, the sand or gravel is charged from such trucked source into a pneumatic pumping device that discharges it into a flexible tube. This can be done by shoveling the sand from a pile or a truck into the pumping device. Advantageously, a belt or like conveyor either mounted on the ground adjacent a pile of the sand or gravel on the truck containing the sand or gravel is employed to move the sand or gravel from the trucked source to the pumping device.

The pumping device serves to pneumatically transport the dry sand or gravel through the flexible tube to a nozzle positioned at the golf course deposit location and a workman located at such location discharges it from said nozzle onto the trap, tee or putting green area to distribute it in the manner needed to properly contour the trap, tee or green.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
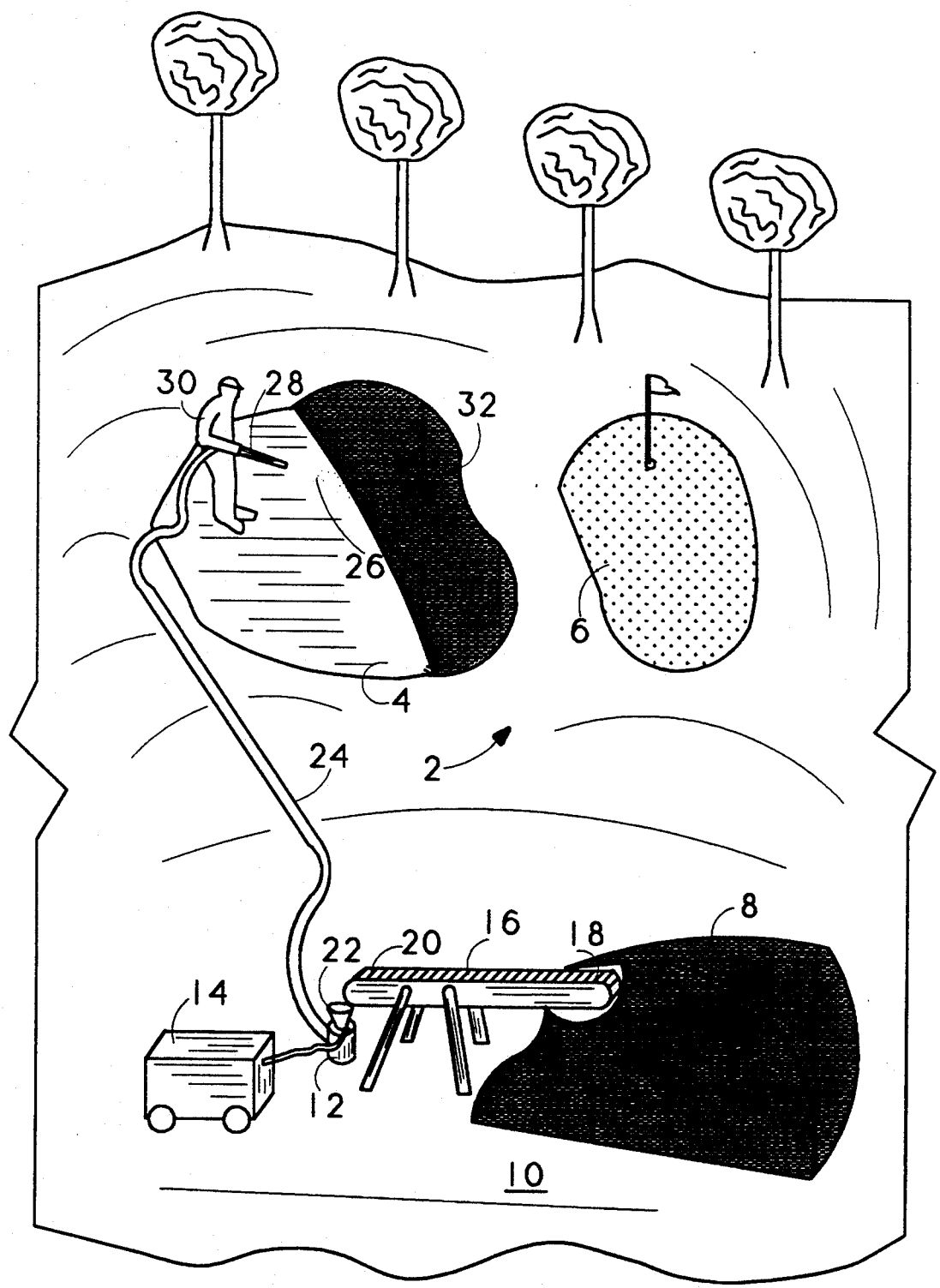
FIG. 1 is a diagrammatic illustration of a golf course sand trap construction operation in accordance with the invention.

Referring first in detail to FIG. 1 of the drawings, the golf course 2 comprises a sand trap 4 and an adjacent putting green 6.

A quantity of trap sand in the form of a pile 8 is provided at the off-load site 10 remote to the trap 4. Also located at the site 10 is a pneumatic pumping device 12, an air compressor 14 and a belt conveyor 16. The conveyor 16 is mounted on the ground so that its intake end 18 can take sand from the pile 8 and charge it from its discharge end 20 into the hopper 22 of the pumping device 12. Advantageously, the pumping device 12 is of the type disclosed in U.S. Pat. Nos. 3,161,442 and 4,025,122. The device 12 receives compressed air from the compressor 14 which serves to fluidize sand that enters device 12 through the hopper 22 and discharges it from device 12 into the flexible tube 24.

The rate of input of sand vs the rate of input of compressed air into device 12 are controlled so that a steady, well formed sand spray 26 will issue from the nozzle 28 as the workman 30 moves the nozzle 28 in a manner to have is spread as an even layer 32 into the sand trap 4.

If the input of compressed air vs sand is excessive, sand will issue from nozzle 28 as a cloud, rather than a structured spray to blow away rather than deposit as desired in the trap 4. On the other hand, if the input of compressed air vs sand is insufficient, sand will lodge in the tube 24, blocking the tube and shuting down the operation. With the ratio of compressed air to sand properly adjusted, the pumping device 12 serves to pneumatically transport the trap sand through the flexible tube 24 to the nozzle 28 and enable the workman 30 located at the trap 4 to discharge the sand from the nozzle 28 as a well structured spray 26 into the trap 4 to distribute it in the manner needed to properly contour the trap.

Operating in accordance with the invention with a crew of three men, a typical sand trap covering about 2400 sq. ft. will require about 35 cubic yards of sand to properly cover the trap to a depth of 4 inches. Using an air compressor capable of supplying 750 cubic feet of air per hour at 150 lbs. pressure and a gunite pumping device made by Reed Manufacturing Co., Inc. of Walnut, Calif. sand and gravel can be pumped at the rate of 9 cubic yards per hour from an off-load site a distance of 300 feet or more to the site being filled. Working in this way, the sanding of the trap can be completed in about 4 hours or less. In contrast, the sanding of the sand trap using the prior wheelbarrow method with a crew of six would typically require one or more days to complete.

When a sand trap needs to be refurbished by removal of degraded sand and replacement with new trap sand, the new method of the invention may be used to haul the old sand from the trap to truck for disposal. When this is accomplished, the equipment is then repositioned so the new trap sand can be moved for the off-load site to the trap.

Figure 2:
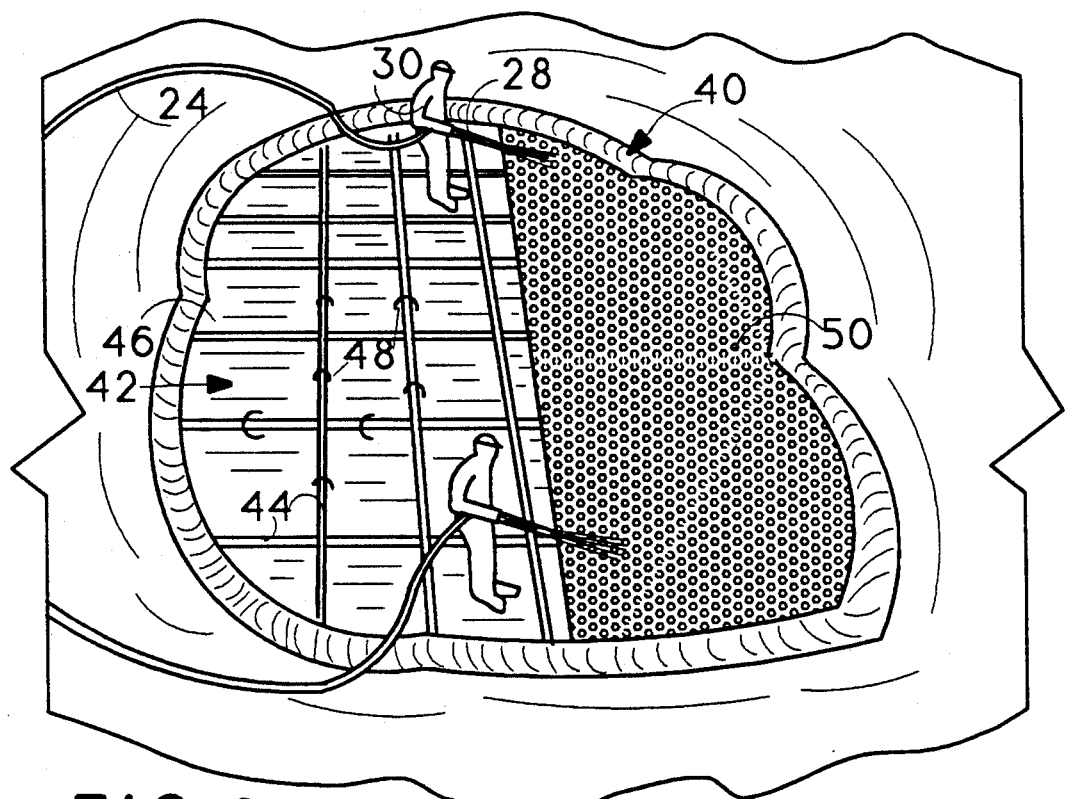
FIG. 2 is a diagrammatic illustration of one phase of a golf course putting green construction operation in accordance with the invention.
Figure 3:
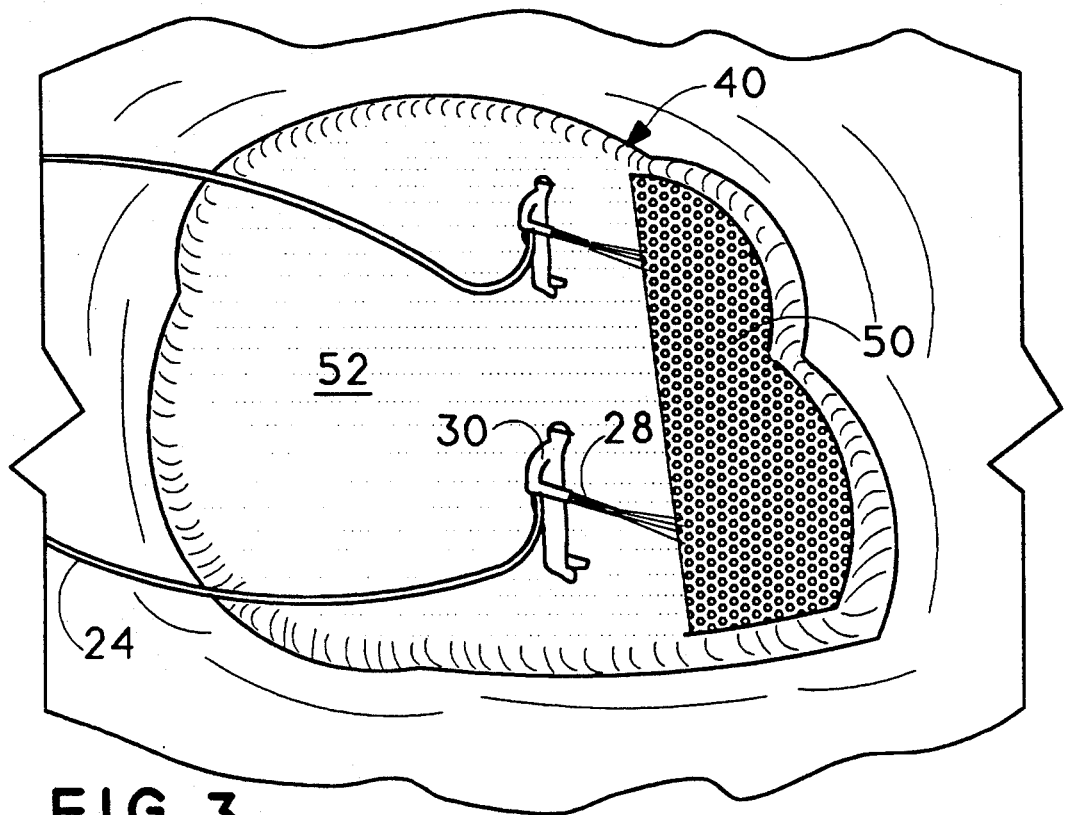
FIG. 3 is a diagrammatic illustration of another phase of a golf course putting green construction operation in accordance with the invention.

Referring now to FIGS. 2 and 3, the construction of a putting green 40 in accordance with the invention can be explained.

Putting greens require specialized drainage to permit them to be watered and properly maintained. A standard construction method is to form a cavity in the terra firms having a depth of several feet below ground level and a perimeter corresponding to the final outline of the proposed green. Trenches are then formed, generally by hand shoveling, in the upper surface of the cavity to accommodate plastic pipe. After the pipe is placed in the trenches, earth is used to fill in the trench around the pipe to the level of the upper surface of the cavity. At this point, gravel is wheelbarrowed to the site and spread about by hand raking until a layer about four inch thick is spread over the entire upper surface. Next, sand is wheelbarrowed to the site and spread around by raking until a two inch "choker" layer of it fully covers the gravel layer. Finally, earth is barrowed to the site to bring the level up to the final design for the green and a layer of sod is applied.

FIGS. 2 and 3 illustrate the improved method of constructing a putting green 40 in accordance with the invention in which first step tracks prior methods by creation of a proper size cavity 42 as aforesaid. Next, drainage pipe 44 is laid directly on the upper surface 46 of the cavity 42 and wire staples 48 are forced over the staples and into the ground to hold the pipe 44 in position.

A layer of gravel is then applied by workmen 30 from nozzles 28 that are pneumatically supplied with the gravel via flexible tubes 24 from a pneumatic pumping device and air compressor as shown and described in FIG. 1. FIG. 2 shows the workman 30 moving from right to left in applying the gravel 50 over the pipes 44 to a uniform depth of four inches.

Following the application of gravel 50, a layer of sand 52 is applied in accordance with the invention as illustrated in FIG. 3. Thus, the workmen 30 now apply sand from the nozzles 28 supplied through the tubes 24 from a remote site (not shown) to form the sand layer 52 having a uniform depth of two inches. FIG. 3 shows this being done as the workmen 30 work from left to right as they cover the gravel 50 with the sand 52.

The putting green is completed in conventional manner by addition of earth to the design height of the green.

The construction of golf course tees can also be improved by the use of the invention to transport and place sand and gravel. Thus, the construction of tees will be substantially like that for putting greens as explained above, but on a small scale since the area covered by tees is substantially less than that of putting greens. In any event, tee construction using the new methods of the invention materially reduces the time and expense required as compared to the methods of construction that have been known and used in the past.

We claim:

1. In a method for the removal of sand from a sand trap of a golf course in an operation for refurbishment of said trap, the improvement which comprises:

pneumatically transporting said sand as a suspension in an air stream passing through a flexible conduit from said trap to a site remote from said sand trap and discharging said sand from said conduit at said remote site.

2. In a method for the construction of a tee or putting green of a golf course, the improvement which comprises:

providing a quantity of gravel at an off-load site remote to said tee or putting green, charging said gravel from said quantity thereof into a pneumatic pumping device that discharges said gravel into a flexible tube, pneumatically transporting said gravel through said flexible tube to a nozzle positioned at said tee or putting green and discharging gravel from said nozzle onto said tee or putting green.

3. In a method for the construction of a putting green of a golf course, the improvement which comprises:

contouring terra firma to form a drainage basin for said putting green presenting a relatively smooth level surface, laying drainage pipe upon said surface and stapling it in place, providing a quantity of gravel at an off-load site remote to said putting green, pneumatically transporting said gravel from said quantity of gravel as a suspension in an air stream passing through a flexible conduit to said putting green, discharging gravel from said conduit onto said putting green to form a layer of gravel about four inches in depth over said surface, providing a quantity of sand at an off-load site remote to said putting green, pneumatically transporting said sand from said quantity of sand as a suspension in a air stream passing through said flexible conduit to said putting green, and discharging sand from said conduit onto said putting green to form a layer of sand about two inches in depth over said layer of gravel.

* * * * *